No. 636,643. Patented Nov. 7, 1899.
S. A. DONNELLY.
AIR COMPRESSOR.
(Application filed July 21, 1898.)
(No Model.) 6 Sheets—Sheet 1.

Fig. 1.

Witnesses
Wm. M. Rheem
Harold Barrett

Inventor
Samuel A. Donnelly
by Gridley & Hopkins
Att'ys.

No. 636,643. Patented Nov. 7, 1899.
S. A. DONNELLY.
AIR COMPRESSOR.
(Application filed July 21, 1898.)
(No Model.) 6 Sheets—Sheet 3.

Fig. 3.

Witnesses. Inventor
Wm. M. Rheem. Samuel A. Donnelly
Harold E. Barrett. by Craley & Hopkins
Atty's No. 636,643. Patented Nov. 7, 1899.
S. A. DONNELLY.
AIR COMPRESSOR.
Application filed July 21, 1898.
(No Model.) 6 Sheets—Sheet 5.

Witnesses
Wm. M. Rheem
Harold E. Bantz

Inventor
Samuel A. Donnelly
by Gridley & Hopkins
Atty's

No. 636,643. Patented Nov. 7, 1899.
S. A. DONNELLY.
AIR COMPRESSOR.
(Application filed July 21, 1898.)
(No Model.) 6 Sheets—Sheet 6.

Witnesses.
Wm. M. Rheem.
Harold B. Barrett.

Inventor
Samuel A. Donnelly
By Gridley & Hopkins
Atty's

United States Patent Office.

SAMUEL A. DONNELLY, OF CHICAGO, ILLINOIS.

AIR-COMPRESSOR.

SPECIFICATION forming part of Letters Patent No. 636,643, dated November 7, 1899.

Application filed July 21, 1898. Serial No. 686,505. (No model.)

*To all whom it may concern:*

Be it known that I, SAMUEL A. DONNELLY, a citizen of the United States, residing at Chicago, in the county of Cook and State of Illinois, have invented certain new and useful Improvements in Air-Compressors, of which the following is a specification.

The object of the present invention is to provide an apparatus which is especially well adapted for receiving the irregular and unsteady power from such sources as wind and the waves and utilizing this power for the purpose of compressing air and storing the same under heavy pressure in suitable reservoirs, from which it may be drawn off for any of the uses to which compressed air is applicable. My aim is to provide a machine which shall be entirely automatic in all of its operations.

An apparatus embodying the invention in its preferred form contemplates the use of a pair of chambers in which the air is compressed alternately, a suitable passage through which the chambers communicate, a body of liquid disposed in the chambers and adapted to be pumped back and forth from one to the other, a pump which is adapted to exhaust the liquid from one chamber and force it into the other until the charge of air previously admitted to this latter chamber is compressed and discharged into the reservoir, means for automatically reversing the pump when this last-described condition is reached, and regulating mechanism controlled by the pressure within the apparatus for changing the relations of the power and load.

In the initial condition of the apparatus the two compression-chambers and the passage connecting them contain a body of liquid (preferably water) which stands at the same level in both chambers, the chambers above the level of the liquid being filled with air. When the pump is started, the liquid will be exhausted from one chamber and discharged into the other and this action continued until the body of air above the liquid in the receiving-chamber is compressed and expelled into a suitable reservoir, the passage between the compression-chamber and reservoir being provided with a non-return valve. During this operation air will enter the delivering-chamber through a passage controlled by an outward-seating valve. When all of the air has been expelled from the receiving-chamber, the pressure produced by the continued action of the pump will be exerted upon suitable reversing mechanism and the pump will be reversed—*i. e.*, conditioned for the flow of the liquid from the chamber which had been receiving it into the chamber which had been delivering it, the latter thereby becoming the receiving-chamber. The liquid will then flow by gravity from the chamber which had been receiving it, as aforesaid, back into the chamber which had been delivering it until the air in the latter chamber is compressed to the extent representing the differential of the hydrostatic columns. The pump will then in the manner already described complete the compression of the air and expel it into the reservoir, whereupon the pump is again reversed, these operations being repeated until the maximum pressure provided for has been reached.

During the act of compressing the air in either of the compression-chambers the resistance offered to the movement of the piston gradually increases from the time the act of compressing the air is begun until the act of compressing it and expelling it into the reservoir is completed, and by reason of the accumulation of pressure in the reservoir the resistance to the discharge of each charge of air from the compression-chambers is greater than the resistance to the discharge of the charge immediately preceding it, and in order that this constant increase in the load may be taken care of, to the end that the apparatus shall not become stalled or subjected to undue strains, I provide a regulator which is controlled directly by the pressure within the compression-chamber in which air is for the time being undergoing compression. This regulator is of such character that it automatically changes the relations of the parts through which the power is transmitted from the original source to the pump-piston. Its operation is such that with a minimum resistance to the pump-piston said pump-piston will have a maximum stroke and with a maximum resistance to the pump-piston said pump-piston will have a minimum stroke. In other words, as the resistance to the pump-piston increases the power-transmitting devices are automatically adjusted so as to increase the transmitted power at a sacrifice of speed.

The invention consists in the features of novelty that are herein fully described, and in order that it may be fully understood I will describe it with reference to the accompanying drawings, which are made a part hereof, and in which—

A and $a$ are two chambers in which the air is compressed. The accessories of these chambers are similar in construction, and corresponding parts of both are represented by similar letters of reference, capital letters being used to designate the parts accessory to the chamber A and small letters for the parts accessory to the chamber $a$. With this explanation, excepting when it becomes necessary to refer to the parts accessory to both chambers, the description will be confined to one chamber and its accessories. Preferably the air-compression chamber consists of a heavy tube threaded at its lower end and screwed into a correspondingly-threaded opening in the top of the base 1, its upper end being threaded for the reception of a correspondingly-threaded cap B. At its upper end the chamber communicates with the atmosphere through a port $A'$, which is controlled by an outward-seating valve $A''$, the arrangement being such that the valve will prevent the escape of air from the chamber through the port $A'$ and will permit the entrance of air to the chamber through said port whenever the pressure within the chamber becomes less than that of the atmosphere. Above the port $A'$ the cap is provided with a port $A^2$, in which is disposed an inward-seating valve, and from this port a pipe $A^3$ leads to the reservoir 2. This arrangement is such that whenever the pressure in the compression-chamber exceeds that in the reservoir air will leave the compression-chamber through the port $A^2$ and pass into the reservoir through the passage $A^3$, and any return of air from the reservoir to the compression-chamber is prevented by the valve in the port $A^2$.

Between the ports $A'$ and $A^2$ the cap B is provided with a cylindrical bore $B'$, in which fits a piston C. This piston is suitably packed so that air cannot escape between it and the cylinder, and a port $C'$ is formed through it, so that when said port is open air from the compression-chamber may pass through the piston in order to reach the port $A^2$. The port $C'$ is, however, under the control of a float-valve $C^2$, which is confined in an open cage or housing carried on the under side of the piston. This arrangement is such that so long as air surrounds the float-valve $C^2$ the port $C'$ will remain open for the passage of air; but as soon as the liquid hereinbefore referred to reaches the float-valve $C^2$ it will lift it and cause it to close the port $C'$. This closes communication between the compression-chamber A and the reservoir, so that any further pressure within the chamber A will be exerted upward upon the piston C, and thereby lift it. This lifting of the piston in turn lifts the latch D, with which it is connected by means of a rod $D'$. The latch is disposed in a chamber E in the base 1 and is adapted to hold the reversing-piston against endwise movement in the manner hereinafter described.

Within the chamber A is an auxiliary chamber F, hereinafter called the "back-pressure" chamber. This back-pressure chamber preferably takes the form of a tube which depends within the chamber A, communication between the upper end of the tube and the chamber A being controlled by a valve $F'$, which seats outward with relation to the back-pressure chamber. This arrangement is such that air can enter the upper end of the back-pressure chamber, but cannot escape therefrom.

Figure 7:
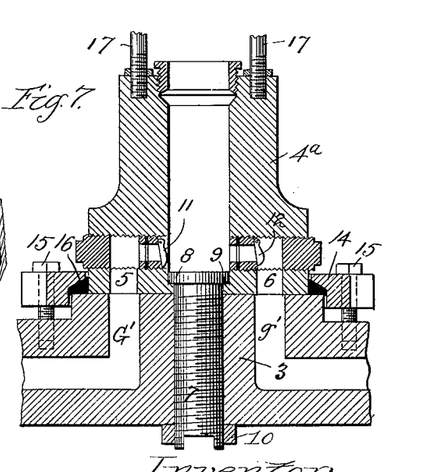
Fig. 7 is a vertical section, on a still larger scale, of one of the pump-cylinders and adjacent portions of the base.

The chambers E and $e$ of the base are connected by a pair of hollow loops, the interior of each of which loops is divided by a diaphragm 3, so that said loops do not have direct internal communication with each other. Through the upper face of one and the lower face of the other of these loops are formed four ports $G'$, $G^2$, $g'$, and $g^2$, and disposed in the breach or opening between these loops are two pump-cylinders 4 and $4^a$, each of which has in its end a pair of ports 5 and 6. The construction of these pump-cylinders and their accessories is best shown in Fig. 7. The cylinder is held in place against the loop by means of a heavy bolt 7, having a head 8, which is about equal in diameter to the internal diameter of the cylinder and engages an internal flange 9 on the cylinder. The bolt passes completely through the loop and is provided at its outer extremity with a notch or equivalent feature for receiving a tool for turning it, a lock-nut 10 being provided for holding it in place. Upon this bolt the cylinder is capable of oscillatory movement for the purpose of bringing its ports 5 and 6 into register with the pair of ports $G'$ and $g'$ or with the pair of ports $G^2$ and $g^2$. The port 5 is the inlet and the port 6 the outlet for the cylinder, and these ports are provided with valves 11 and 12, respectively, the former of which seats outward and the latter inward. In order to make a liquid-tight joint between the end of the cylinder and the loop, the latter is provided with a raised portion 13, surrounded by a ring 14, held down by bolts 15, and upon the raised portion 13 is disposed a packing-ring 16, which surrounds the end of the cylinder and is held in place by the ring 14. In addition to these means for holding the pump-cylinders in place they are connected by means of tie-rods or bolts 17, having right and left threads, so that by turning the bolts in one direction or the other the cylinders may be drawn together or forced apart, as desired. The cylinders are disposed with their axes coincident, and their pistons preferably consist of a single cylindrical body 18, the opposite ends of which occupy the cylinders, respectively.

By this construction and disposition of the parts the pressures upon them are balanced, and thus the resistance to the oscillatory movement of the cylinders is reduced to a minimum.

Figure 3:
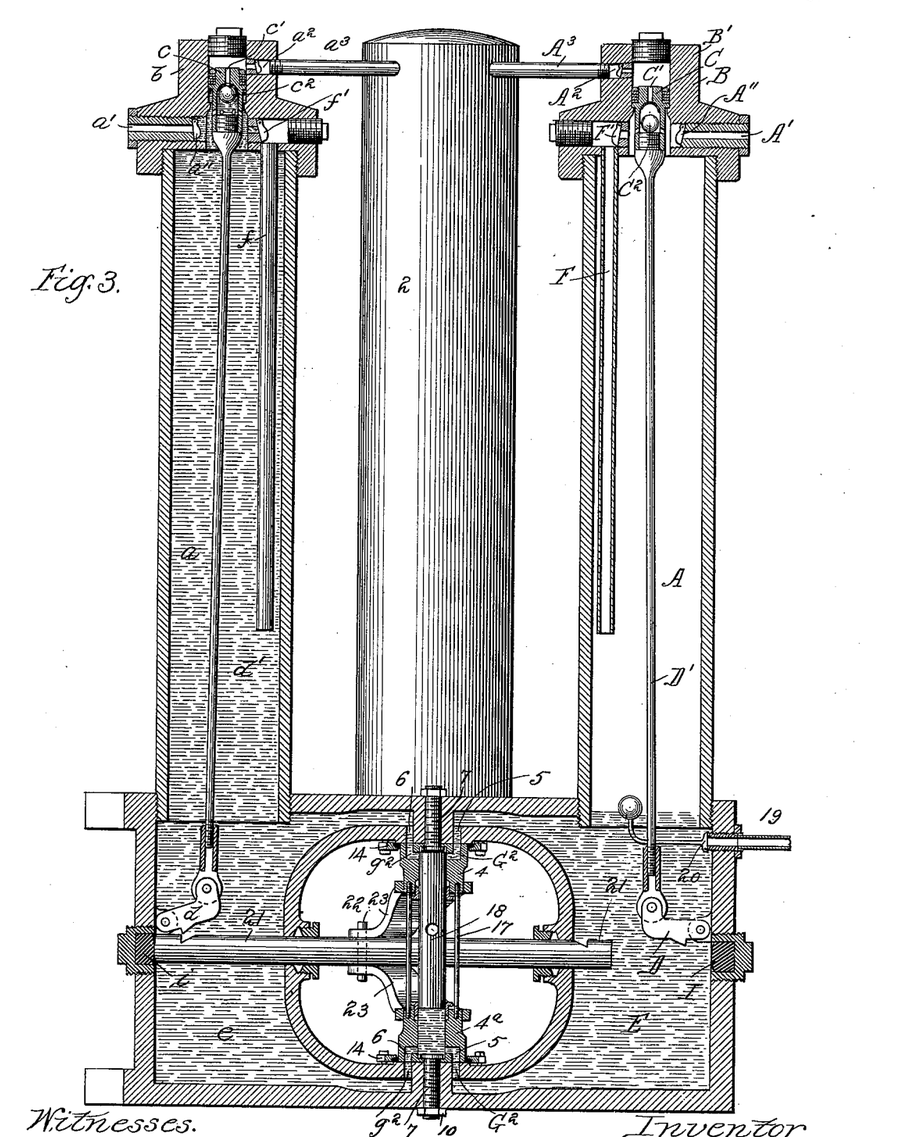
Fig. 3 is a vertical section thereof on the line 3 3, Fig. 2.
Figure 4:
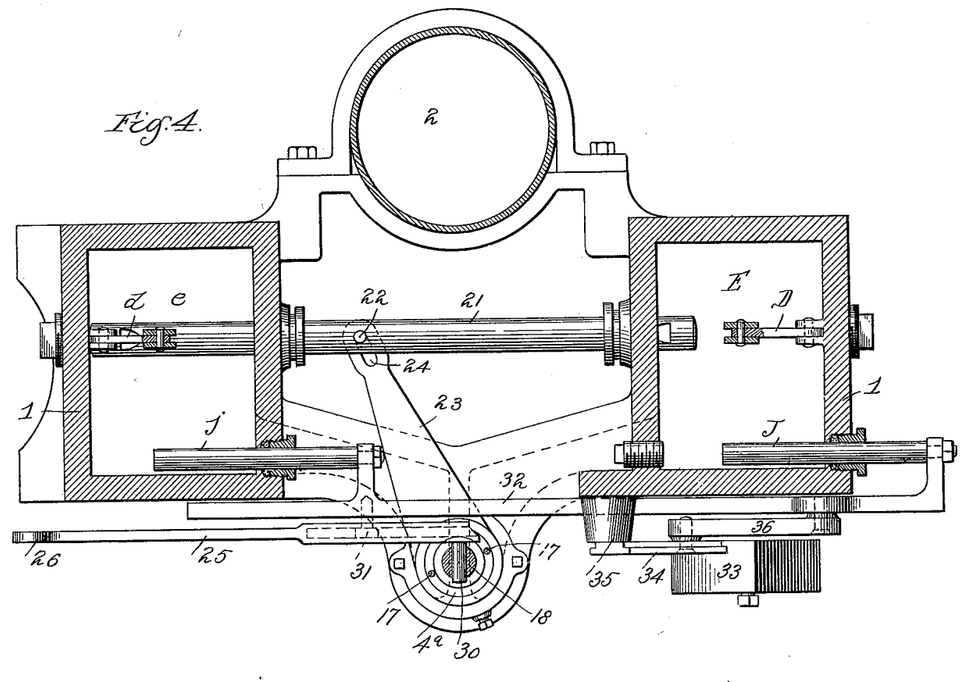
Fig. 4 is a horizontal section thereof upon a plane which is approximately indicated by the line 4 4, Fig. 1.
Figure 5:
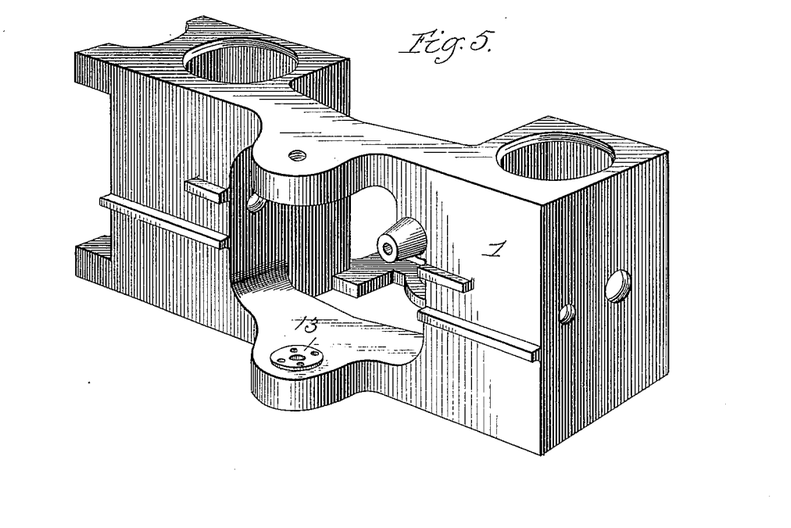
Fig. 5 is a perspective view of the base of the machine.
Figure 6:
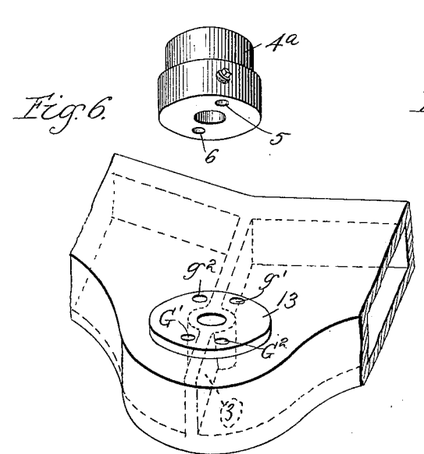
Fig. 6 is a perspective view of a portion thereof on a larger scale and one of the pump-cylinders.

As shown in Fig. 3, the compression-chambers A $a$ and the chambers E $e$ contain a body of liquid. The quantity of liquid is such that its level in the chambers E $e$ will never fall below that indicated in Fig. 3, the intention being that the passages through which the chambers E and $e$ communicate shall be kept always full of liquid, and in order to prevent the liquid from falling below this level one of the chambers—E, for example—is connected with the source from which the liquid is supplied by a tube 19 under the control of a valve 20, which latter is in turn under the control of the float. As the pump-piston is reciprocated the liquid will be exhausted from one of the compression-chambers and discharged into the other. While this is taking place, the body of air above the liquid will be compressed, and as the level of the liquid rises the air will be expelled from the compression-chamber into the reservoir 2 in the manner already described. In Fig. 3 the parts are shown in the positions which they occupy at the instant the compression of the air in the chamber $a$ is completed and the pumps are about to be reversed. The liquid in the chamber $a$ has risen to such a height that the valve $c^2$ has closed the port $c'$, and after this took place the continued action of the pump in forcing liquid into the chamber $a$ caused a pressure upon the piston $c$ and moved the latter upward. In doing so the latch $d$ was lifted from its engagement with the reversing-piston 21, and the latter was thereby freed from restraint. The end of the reversing-piston 21 which occupies the chamber $e$ is therefore under the pressure of the liquid in said chamber, and this pressure will cause the reversing-piston to be projected until its end which occupies the chamber E is engaged by the latch D. This movement of the reversing-piston will cause the pump-cylinders 4 and $4^a$ to be oscillated and their ports 5 and 6 to be brought to register with the ports G' and $g'$, respectively. The liquid will then flow by gravity from the chamber $a$ into the chamber A until the air in the latter reaches a pressure equal to the differential of the hydrostatic columns.

Liquid being practically non-compressible, it follows that if the liquid alone were depended upon for shifting the reversing-piston the only pressure available would be that of the hydrostatic column. It might or might not be sufficient. In order, however, to provide an adequate force for shifting the reversing-piston with certainty, the back-pressure chamber $f$ is used. As the liquid is being forced into the chamber $a$ the air confined in the back-pressure chamber $f$ is being compressed, and this body of compressed air exerts its pressure upon the liquid confined in the chamber $a$. As soon, therefore, as the reversing-piston 21 is released this confined compressed air in the back-pressure chamber seeks instant release and in doing so causes the reversing-piston to be projected from the chamber $e$ into the chamber E, where it is engaged by the latch D. In order to prevent any considerable jar incident to the impact of the reversing-piston, a buffer I is disposed opposite the end of the piston. This buffer may be of any desired construction.

Movement is transmitted from the reversing-piston to the cylinders 4 and $4^a$ through the medium of a pin 22, carried by the reversing-piston and a pair of levers 23, each connected at one end to one of the cylinders and provided at the other end with a slot 24, in which the pin 22 works.

Figure 1:
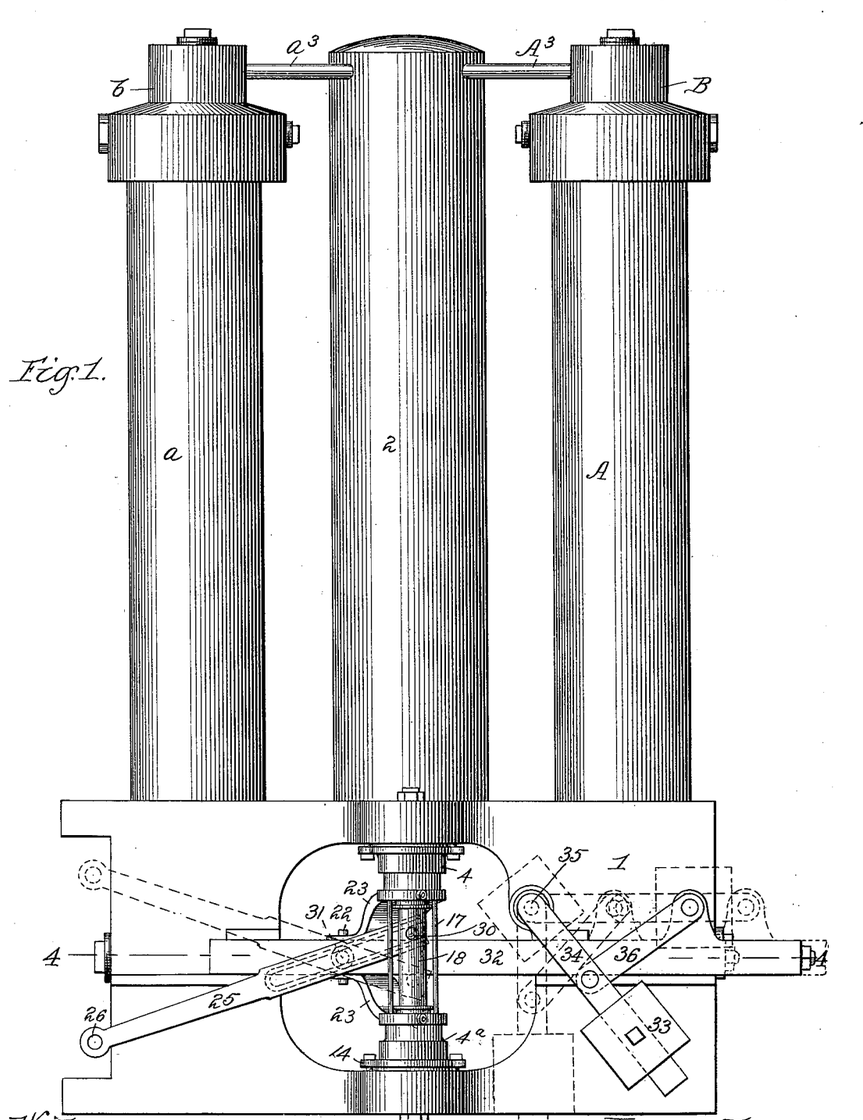
Figure 1 is a front elevation of an air-compressor embodying the invention in its preferred form.
Figure 2:
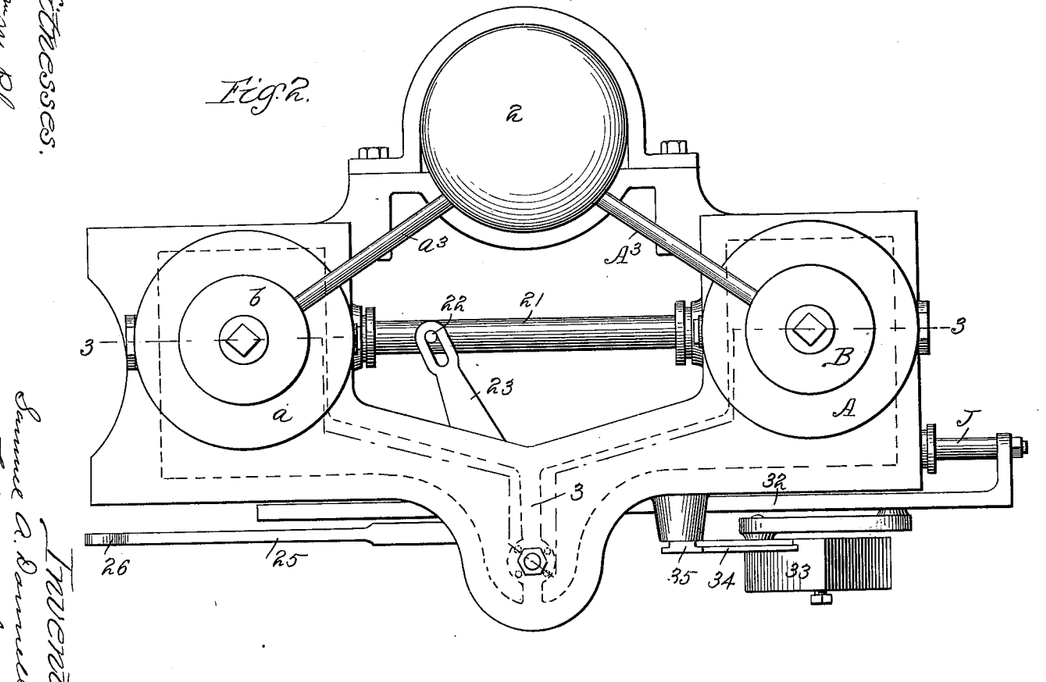
Fig. 2 is a plan view thereof.
Figure 8:
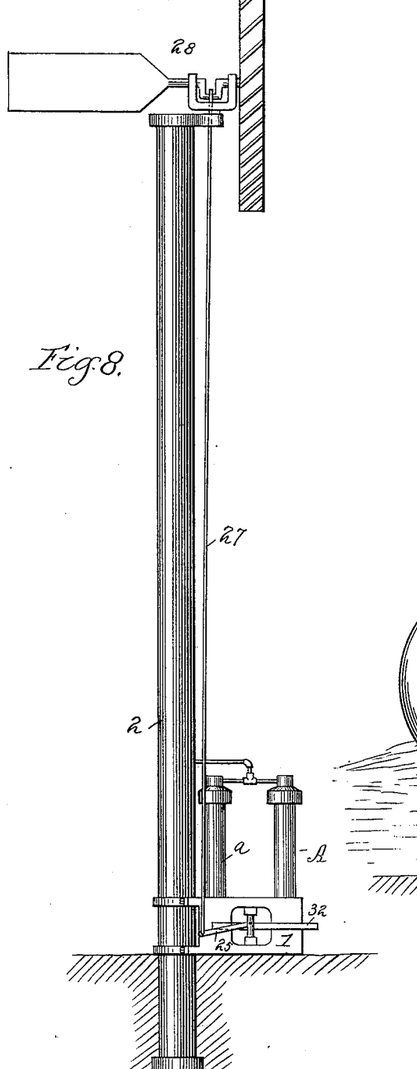
Fig. 8 is an elevation of the improved apparatus and a windmill connected therewith.
Figure 9:
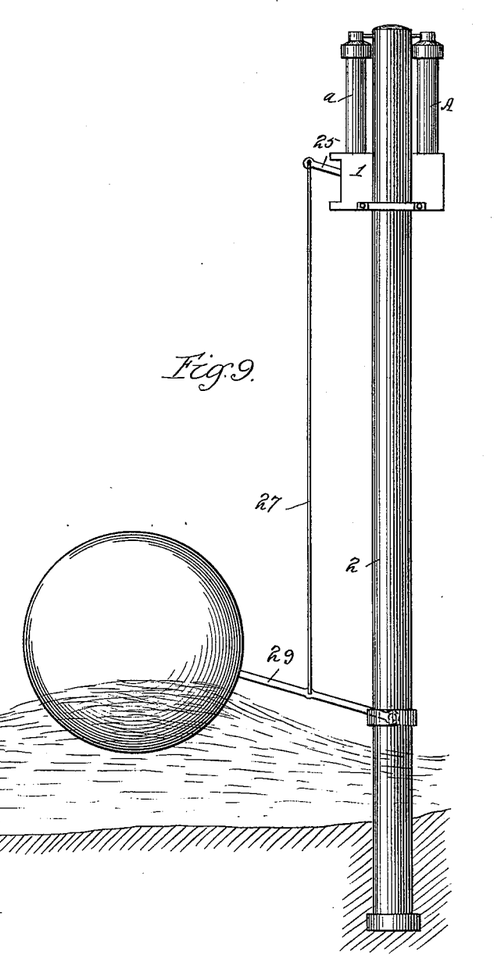
Fig. 9 is an elevation of the improved apparatus and a wave-motor connected therewith.

The main lever by which the pump-pistons 18 are operated is shown at 25. Its power end 26 is connected by any suitable device with the source from which the power is derived. In Fig. 8 I have shown it as being connected by means of a rod 27 with a windmill 28, and in Fig. 9 I have shown it as being connected by a rod 27 with a wave-motor 29. The invention is not concerned with the source from which the power is derived. The load end of the lever is connected with the pistons, preferably by means of a pin 30, occupying an opening in the connected pistons, and the fulcrum 31 is supported by a slide 32. The fulcrum has a sliding connection with the lever, and as it partakes of the movement of the slide 32 the relative lengths of the two arms of the lever 25 are varied. The slide 32 is connected with a pair of pistons J $j$, arranged tandem fashion and projecting into the chambers E and $e$, respectively, so that their ends are subjected to the pressures in the chambers. Any pressure within the chambers acting upon the ends of the pistons J $j$ tends to move the fulcrum 31 of the lever toward its load end, thereby shortening the load end and lengthening the power end, with the well-known results. Unless some means were employed to prevent it a comparatively slight pressure within the chambers E and e would project the pistons J and j to the limit of their movement and bring the fulcrum 31 in line with the point 30, at which the load is applied, and in this position of the fulcrum the lever 25 could continue its movement without imparting any movement to the pistons 18. In order to prevent this movement of the pistons J and j by a slight pressure within the chambers E and e and at the same time resist their movement by a force which gradually increases at a ratio directly proportional to the increase in the pressure within the chambers E and e, I couple the slide 32 with a suitable resisting device. Preferably this resisting device consists of a weight 33, supported by a link 34, which is hung from a center 35, supported by the frame, and the link 34 is connected with the slide 32 by means of a link 36. With this arrangement when the minimum pressure exists in the chambers E and e the link 34 will hang in vertical position, and while in this position the weight 33 will offer a minimum resistance to the movement of the pistons. As the slide 32 moves under the influence of the pressure upon the pistons J j the weight 33 and the link 34 are moved toward positions which will bring the link 34 to horizontal position, as indicated in Fig. 1, and as this position is approached the resisting effect of the weight gradually increases, its maximum resistance being reached when the link 34 reaches horizontal position. By this means I provide automatic means for varying the relative lengths of the power and load arms of the operating-lever, so that even with a comparatively small power applied to the power end of the lever I am enabled to derive a great pressure from the load end thereof, always, however, at a sacrifice of speed. This enables me to take power from the sources described and store air under very heavy pressure without danger of straining any of the parts of the apparatus or of exceeding the maximum pressure for which the apparatus is designed.

The use of a body of liquid as a piston for compressing the air has many advantages, among which may be mentioned the fact that it is very much easier to make a liquid-tight than an air-tight joint. Aside from this liquid being practically non-compressible it will not be heated to any appreciable extent by the action of the pump, whatever heating of the liquid takes place being due in greater part to its contact with the body of air in the compression-chamber.

Where it is practical to do so, I prefer to make use of the reservoir 2 as a support for the windmill, wave-motor, or other power-producing device.

Having thus described my invention, the following is what I claim as new therein and desire to secure by Letters Patent:

1. In an air-compressor, the combination of a pair of chambers having air inlets and outlets, a body of liquid in the chambers, a reversible pump adapted to exhaust the liquid from one and discharge it into the other of said chambers, means for reversing the pump, said means including movable parts exposed to the pressure within the chambers, latches for restraining the movement of said parts until the latches are retracted, devices disposed in the upper parts of the chambers and adapted to be raised when the liquid reaches them, and means for transmitting the movement of said devices to the latches for retracting them, substantially as set forth.

2. In an air-compressor, the combination of a pair of chambers having at the top outlets for the air, a body of liquid in the chambers, a reversible pump adapted to exhaust liquid from one chamber and discharge it into the other, means operated by the pressure within the chambers for reversing the pump, said means including movable parts exposed to the pressure within the chambers, latches for normally holding the reversing mechanism, pistons disposed in the upper parts of the chambers and having ports for the passage of air to the air-outlets, float-valves for controlling said ports, and means connecting the pistons with the latches, whereby when the liquid within the receiving-chamber reaches the float-valve therein, said valve will close the port through the piston and thus cause the piston to receive the pressure of the liquid and retract the latch, permitting the reversing mechanism to operate, substantially as set forth.

3. In an air-compressor, the combination of a pair of chambers, a body of liquid therein, a reversible pump through which the chambers communicate and by which the liquid may be exhausted from one and discharged into the other of said chambers and mechanism for reversing said pump, said mechanism including a piston projecting at its opposite ends into the chambers, respectively, means for holding the piston in projecting position, and means actuated by the pressure within the apparatus for releasing the piston and moving it endwise, substantially as set forth.

4. In an air-compressor, the combination of a pair of chambers, a body of liquid contained therein, a reversible pump through which the chambers communicate, a piston projected at its opposite ends into the chambers, respectively, means actuated by the movement of said piston for reversing the pump, means for holding the piston in projected position with respect to each chamber, and means actuated by the rising liquid for releasing the piston, whereby the pressure within one of the chambers moves the piston endwise, substantially as set forth.

5. In an air-compressor, the combination of a pair of chambers, a body of liquid contained therein, a pump through which the chambers communicate, said pump having a cylinder which is capable of oscillation and which has inlet and outlet ports adapted to register with corresponding ports of the chambers aforesaid, and means for oscillating the cylinder, substantially as set forth.

6. In an air-compressor, the combination of a pair of chambers, a body of liquid contained therein, a pair of pumps through which the chambers communicate, said pumps having cylinders disposed with their axes coincident and provided with inlet and outlet ports adapted to register with corresponding ports of the chambers aforesaid, and means for oscillating the cylinders, substantially as set forth.

7. In an air-compressor, the combination of a pair of chambers, a body of liquid contained therein, and a pair of pumps disposed opposite each other so that the pressures upon them are balanced, each of said pumps having a cylinder, inlet and outlet ports, communicating with the chambers, respectively, and means for reversing the pumps, substantially as set forth.

8. In an air-compressor, the combination of a pair of chambers, a body of liquid contained therein, a reversible pump through which the chambers communicate, means actuated by the pressure within one of the chambers for reversing the pump, said means including a back-pressure chamber communicating with each of the compression-chambers, substantially as set forth.

9. In an air-compressor, the combination of a pair of compression-chambers, a body of liquid disposed therein, a reversible pump through which the chambers communicate, means actuated by the pressure in one of the chambers for reversing the pump, said means including back-pressure chambers communicating with the compression-chambers at both their upper and lower ends, and valves for controlling the communication at their upper ends, substantially as set forth.

10. In an apparatus of the class described, the combination of a compression-chamber, mechanism for forcing fluid thereinto under pressure, said mechanism having parts that are relatively adjustable for the purpose of varying the relations of the power and load, and automatically-operating means operated by the pressure in the compression-chamber for adjusting said relatively-adjustable parts and thereby adjusting the relations of the power and load, said automatically-operating means including a movable part exposed directly to the pressure within the compression-chamber, substantially as set forth.

11. In an apparatus of the class described, the combination of a compression-chamber, mechanism for forcing fluid thereinto under pressure, said mechanism having parts that are relatively adjustable for the purpose of varying the relations of the power and load, a movable part exposed directly to the pressure in the compression-chamber and adapted to be moved thereby, means for offering a gradually-increasing resistance to the movement of said part, whereby it is caused to move gradually as the pressure in the compression-chamber increases, and means connecting said movable part with the relatively-adjustable part aforesaid whereby the relations of the power and load are gradually varied as the movable part aforesaid responds to the pressure in the compression-chamber, substantially as set forth.

12. In an apparatus of the class described, the combination of a compression-chamber, mechanism for forcing fluid thereinto under pressure, said mechanism including a lever and an adjustable fulcrum therefor, and means operated by the pressure within the compression-chamber for automatically adjusting the fulcrum of the lever for the purpose of varying the relations of the power and load, substantially as set forth.

13. In a fluid-pressure apparatus, the combination of a compression-chamber, a pump for forcing fluid thereinto under pressure, mechanism for operating the pump, said mechanism including a lever and an adjustable fulcrum therefor, and means operated by the pressure within the compression-chamber for adjusting the fulcrum of the lever and thereby changing the relations of the power and load, substantially as set forth.

14. In a fluid-pressure apparatus, the combination of a compression-chamber, a pump for forcing fluid thereinto under pressure, mechanism for operating said pump, said mechanism including a lever and a fulcrum therefor, said lever and fulcrum being relatively adjustable, means operated by the pressure within the compression-chamber for relatively adjusting the fulcrum and lever, and means for offering a gradually-increasing resistance to said adjustment, substantially as set forth.

15. In an apparatus of the class described, the combination with a pair of compression-chambers, a body of liquid, a reversible pump adapted to alternately exhaust the liquid from one of said chambers and discharge it into the other, and means for operating the pump, of mechanism operated by the pressure produced by the pump for reversing the pump, substantially as set forth.

16. In an air-compressor, the combination of a compression-chamber, means for admitting thereto the air to be compressed, a body of liquid, a pump for forcing the liquid into the compression-chamber and thereby compressing the air therein, mechanism for operating the pump, said mechanism having parts that are relatively adjustable for the purpose of varying the relations of the power and load, and means operated by the pressure in the compression-chamber for automatically adjusting said relatively-adjustable parts, substantially as and for the purpose set forth.

17. In an air-compressor, the combination of a compression-chamber, means for admitting thereto the air to be compressed, a body of liquid, a pump for forcing the liquid into the compression-chamber and thereby compressing the air therein, mechanism, including a lever, for operating the pump, and means operated by the pressure in the compression-chamber for changing the relations of the power, fulcrum and load points of said lever, substantially as and for the purpose set forth.

18. In an apparatus of the class described, the combination of a compression-chamber, a pump for compressing fluid therein, mechanism for operating the pump, said mechanism having parts that are relatively adjustable for the purpose of varying the relations of the power and load, and mechanism having a part exposed directly to the pressure in the compression-chamber for automatically changing the relations of said adjustable parts, substantially as and for the purpose set forth.

19. In an apparatus of the class described, the combination with a compression-chamber, a pump for compressing fluid therein, and means including a lever for operating the pump, of a piston exposed to the pressure produced by the pump, and means operated by the piston for changing the relations of the power, fulcrum and load points of the lever, substantially as and for the purpose set forth.

20. In an apparatus of the class described, the combination with a compression-chamber, a pump for compressing fluid therein, means for operating the pump, said means having parts that are relatively adjustable for the purpose of varying the relations of the power and load, mechanism operated by the pressure produced by the pump for adjusting said parts, and means for offering a gradually-increasing resistance to the operation of said mechanism, substantially as set forth.

21. In an apparatus of the class described, the combination with a compression-chamber, a pump for compressing fluid therein, and means including a lever for operating said pump, of mechanism operated by the pressure produced by the pump for changing the relations of the power, fulcrum and load points of the lever, and means for offering a gradually-increasing resistance to the operation of said mechanism and to the change produced thereby, substantially as and for the purpose set forth.

22. In an apparatus of the class described, the combination with a compression-chamber, a pump for compressing fluid therein, and means for operating said pump, said means having parts that are relatively adjustable for the purpose of automatically changing the relations of the power and load, of mechanism operated by the pressure produced by the pump for automatically adjusting the relations of said adjustable parts, and means for resisting the operation of the mechanism last aforesaid, said means including a weight and a swinging arm by which it is carried, substantially as and for the purpose set forth.

23. In an apparatus of the class described, the combination with a pair of compression-chambers, a body of liquid, a reversible pump adapted to alternately exhaust the liquid from one and discharge it into the other of said chambers, and means for operating said pump, of a slide, a pair of pistons connected thereto and exposed to the pressure produced by the pump, a weight, a swinging arm by which the weight is carried, a connection between the arm and slide, and means controlled by the slide for changing the relations of the power and load, substantially as set forth.

SAMUEL A. DONNELLY.

Witnesses:
L. M. HOPKINS,
N. C. GRIDLEY.